US 9,513,961 B1

(12) United States Patent
Hendriks et al.

(10) Patent No.: US 9,513,961 B1
(45) Date of Patent: Dec. 6, 2016

(54) MONITORING APPLICATION LOADING (71) Applicant: Google Inc., Mountain View, CA (US)

(72) Inventors: Erik Hendriks, Kirkland, WA (US); Mario Guajardo-Cespedes, Mountain View, CA (US); Thomas William Knych, San Francisco, CA (US); Chen Wang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 282 days.

(21) Appl. No.: 14/243,030

(22) Filed: Apr. 2, 2014

(51) Int. Cl.
*G06F 9/44* (2006.01)
*G06F 9/46* (2006.01)
(Continued)

(52) U.S. Cl.
CPC .......... *G06F 9/4843* (2013.01); *G06F 9/4443* (2013.01); *G06F 9/5027* (2013.01); *G06F 9/45504* (2013.01); *G06F 11/3644* (2013.01)

(58) Field of Classification Search
CPC ................... G06F 17/30867; G06F 17/30864; G06F 11/3476; G06F 9/4843; G06F 9/45504; G06F 9/4881; G06F 9/544; G06F 17/30991; G06F 17/30274; G06F 17/3087; G06F 17/3089; G06F 17/30415; G06F 17/30699; G06F 17/30616; G06F 9/4443; G06F 9/542; G06F 9/4887; G06F 9/546; G06F 9/5083; G06F 9/5027; G06F 9/541; G06F 9/505; G06F 11/3644; G06F 11/3423; G06F 11/3419
See application file for complete search history.

(56) References Cited

U.S. PATENT DOCUMENTS 5,961,584 A * 10/1999 Wolf ........................ G06F 9/542
718/100
6,006,235 A * 12/1999 Macdonald ....... G06F 17/30415
707/702

(Continued)

FOREIGN PATENT DOCUMENTS

EP   2474905 A2   7/2012
EP   2495670 A1   9/2012

OTHER PUBLICATIONS

Gautam Pant et al., Crawling the Web, 2004, [Retrieved on Jul. 27, 2016]. Retrieved from the internet: <URL: http://download.springer.com/static/pdf/63/chp%253A10.1007%252F978-3-662-10874-1_7.pdf> 25 Pages (153-177).*

(Continued)

*Primary Examiner* — Thuy Dao
*Assistant Examiner* — Anibal Rivera
(74) *Attorney, Agent, or Firm* — Fish & Richardson P.C.

(57) ABSTRACT

Methods, systems, and apparatus, including computer programs encoded on a computer storage medium, for determining when an application is sufficiently instantiated to be subject to a crawling operation. In one aspect, a method includes instantiating an instance of a native application that generates environment instances for display on a user device within the native application instance; monitoring requests for content sent from the native application instance to serving entities that are external to the native application instance; determining whether each monitored request has been fulfilled; in response to determining that the requests are fulfilled: determining whether each thread in a set of threads of the native application instance is idle, generating a load signal in response to determining each thread in the set of thread of the native application instance is idle, the (Continued)

load signal indicating the native application instance is sufficiently instantiated to be subject to a crawling operation.

21 Claims, 4 Drawing Sheets

(51) Int. Cl.
*G06F 9/48* (2006.01)
*G06F 9/50* (2006.01)
G06F 11/36 (2006.01)
G06F 9/455 (2006.01)

(56) References Cited

U.S. PATENT DOCUMENTS

| | | | |
|---|---|---|---|
| 6,275,983 B1* | 8/2001 | Orton | G06F 8/76 717/116 |
| 6,351,755 B1* | 2/2002 | Najork | G06F 17/30864 707/E17.108 |
| 6,377,984 B1* | 4/2002 | Najork | G06F 17/30864 707/E17.108 |
| 6,418,433 B1* | 7/2002 | Chakrabarti | G06F 17/30864 |
| 6,832,376 B1* | 12/2004 | Sievert | G06F 9/4843 718/102 |
| 7,000,242 B1* | 2/2006 | Haber | G06F 17/30274 715/719 |
| 7,234,139 B1* | 6/2007 | Feinberg | G06F 9/45504 718/1 |
| 7,617,225 B2 | 11/2009 | Arrouye | |
| 8,060,487 B2 | 11/2011 | Schmidt-Karaca | |
| 8,086,957 B2 | 12/2011 | Bauchot | |
| 8,433,620 B2 | 4/2013 | Futty | |
| 8,458,384 B2 | 6/2013 | Johnson | |
| 8,510,764 B1 | 8/2013 | Deselaers | |
| 8,515,979 B2 | 8/2013 | Mehta | |
| 8,554,345 B2 | 10/2013 | Fernandez | |
| 8,595,450 B2 | 11/2013 | Nguyen | |
| 8,660,849 B2 | 2/2014 | Gruber | |
| 8,666,938 B1* | 3/2014 | Pancholy | G06F 9/455 707/610 |
| 8,688,726 B2 | 4/2014 | Mahajan | |
| 8,874,569 B2 | 10/2014 | Miller | |
| 9,002,821 B2* | 4/2015 | Chang | G06F 17/30864 707/711 |
| 9,043,333 B1 | 5/2015 | Look | |
| 9,104,787 B2 | 8/2015 | Kumar | |
| 9,251,224 B2 | 2/2016 | Imaizumi | |
| 2001/0054020 A1* | 12/2001 | Barth | G06F 17/30867 705/37 |
| 2002/0144003 A1* | 10/2002 | Jin | G06F 9/544 719/310 |
| 2002/0198985 A1* | 12/2002 | Fraenkel | G06F 11/3419 709/224 |
| 2003/0115188 A1* | 6/2003 | Srinivasa | G06F 17/30699 |
| 2003/0115189 A1* | 6/2003 | Srinivasa | G06F 17/30699 |
| 2003/0200254 A1* | 10/2003 | Wei | G06F 9/4443 709/203 |
| 2004/0030882 A1 | 2/2004 | Forman | |
| 2005/0086359 A1* | 4/2005 | Banerjee | G06F 9/5027 709/232 |
| 2005/0229176 A1* | 10/2005 | Findeisen | G06F 11/3423 718/100 |
| 2006/0048160 A1* | 3/2006 | Olszewski | G06F 9/5083 718/105 |
| 2006/0059146 A1* | 3/2006 | McAllister | G06F 8/00 |
| 2006/0230011 A1* | 10/2006 | Tuttle | G06F 17/30864 706/62 |
| 2007/0199001 A1* | 8/2007 | Grasso | G06F 9/5027 719/330 |
| 2007/0209080 A1 | 9/2007 | Ture | |
| 2009/0019312 A1* | 1/2009 | Kulkarni | G06F 11/3644 714/32 |
| 2009/0070766 A1* | 3/2009 | Berman | G06F 9/505 718/104 |
| 2009/0113440 A1* | 4/2009 | Dorny | G06F 9/546 718/104 |
| 2010/0100899 A1* | 4/2010 | Bradbury | H04N 7/17318 725/29 |
| 2010/0257466 A1 | 10/2010 | Wroblewski | |
| 2010/0306191 A1 | 12/2010 | LeBeau | |
| 2011/0066609 A1* | 3/2011 | Ashkenazi | G06F 17/30864 707/709 |
| 2011/0252038 A1 | 10/2011 | Schmidt | |
| 2011/0264646 A1* | 10/2011 | Sokolan | G06F 17/30616 707/711 |
| 2011/0276568 A1 | 11/2011 | Fotev | |
| 2011/0307463 A1* | 12/2011 | Kasterstein | G06F 17/30864 707/706 |
| 2011/0314004 A1 | 12/2011 | Mehta | |
| 2012/0011167 A1* | 1/2012 | Schmidt | G06F 17/3087 707/802 |
| 2012/0016678 A1 | 1/2012 | Gruber | |
| 2012/0124061 A1 | 5/2012 | Macbeth | |
| 2012/0144281 A1* | 6/2012 | Schechter | G06F 17/30867 715/205 |
| 2012/0159510 A1* | 6/2012 | Kumar | G06F 9/544 718/105 |
| 2012/0179706 A1 | 7/2012 | Hobbs | |
| 2012/0179955 A1 | 7/2012 | French | |
| 2012/0284247 A1 | 11/2012 | Jiang | |
| 2012/0284256 A1 | 11/2012 | Mahajan | |
| 2012/0290584 A1 | 11/2012 | De | |
| 2012/0316955 A1 | 12/2012 | Panguluri | |
| 2012/0323898 A1 | 12/2012 | Kumar | |
| 2013/0006897 A1 | 1/2013 | Jain | |
| 2013/0110815 A1* | 5/2013 | Tankovich | G06F 17/30867 707/711 |
| 2013/0111328 A1 | 5/2013 | Khanna | |
| 2013/0122861 A1 | 5/2013 | Kim | |
| 2013/0124606 A1 | 5/2013 | Carpenter | |
| 2013/0139182 A1* | 5/2013 | Sethuraman | G06Q 50/01 719/320 |
| 2013/0191360 A1 | 7/2013 | Burkard | |
| 2013/0212484 A1* | 8/2013 | Joshi | G06F 9/541 715/740 |
| 2013/0212486 A1* | 8/2013 | Joshi | H04W 4/02 715/744 |
| 2013/0232256 A1 | 9/2013 | Lee | |
| 2013/0283285 A1* | 10/2013 | Zhou | G06F 9/4881 718/103 |
| 2013/0290854 A1* | 10/2013 | Shukla | G06F 17/3089 715/736 |
| 2013/0298007 A1 | 11/2013 | Cullen | |
| 2013/0305385 A1* | 11/2013 | Korteweg | G06F 21/10 726/27 |
| 2013/0325856 A1 | 12/2013 | Soto | |
| 2014/0136691 A1* | 5/2014 | Crosby | G06F 11/3476 709/224 |
| 2014/0188897 A1 | 7/2014 | Baker | |
| 2014/0222833 A1* | 8/2014 | Jia | G06Q 30/02 707/748 |
| 2014/0244464 A1* | 8/2014 | Pinski | G06Q 20/354 705/35 |
| 2014/0245141 A1 | 8/2014 | Yeh | |
| 2014/0304709 A1* | 10/2014 | Chandhoke | G06F 9/4887 718/102 |
| 2014/0359519 A1* | 12/2014 | Luu | G06F 17/30991 715/780 |
| 2014/0359598 A1 | 12/2014 | Oliver | |
| 2015/0006328 A1 | 1/2015 | Yoon | |
| 2015/0038161 A1 | 2/2015 | Jakobson | |
| 2015/0052061 A1* | 2/2015 | Anderson | G06Q 20/409 705/71 |

OTHER PUBLICATIONS

Andrei Z. Broder et al., Efficient URL Caching for World Wide Web Crawling, May 20-24, 2003, [Retrieved on Jul. 27, 2016]. Retrieved (56) References Cited

OTHER PUBLICATIONS from the internet: <URL: http://dl.acm.org/citation.cfm?id=775247> 11 Pages (679-689).*

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through a "Web" of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

* cited by examiner

MONITORING APPLICATION LOADING

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

Furthermore, with the advent of tablet computers and smart phones, native applications that facilitate the performance of the same functions facilitated by the use of web page resources are now being provided in large numbers. Additionally, native applications that do not have websites with synchronous content, such as games, are also very popular on tablet computers and smart phones. Accordingly, search systems now also facilitate searching of these native applications.

One process by which search systems gather information for native applications is by accessing "deep links" for the native applications. A deep link is an instruction specifying a particular environment instance of a native application and configured to cause the native application to instantiate the environment instance of the specified native application when selected at a user device. The native application generates the environment instance for display within the native application on a user device.

Once the native application is instantiated, the search system may crawl and index the content provided in the environmental instance. The native application, however, should be fully instantiated before the crawling and indexing operation beings, otherwise some information may not be indexed.

SUMMARY

This specification describes technologies relating to monitoring application loading to determine when an application is sufficiently instantiated to be subject to a crawling operation.

In general, one innovative aspect of the subject matter described in this specification can be embodied in methods that include the actions of instantiating an instance of a native application that generates environment instances for display on a user device within the native application instance; monitoring requests for content sent from the native application instance to serving entities that are external to the native application instance; determining whether each monitored request has been fulfilled; in response to determining that each monitored request has been fulfilled: determining whether each thread in a set of threads of the native application instance is idle, generating a load signal in response to determining each thread in the set of thread of the native application instance is idle, the load signal indicating the native application instance is sufficiently instantiated to be subject to a crawling operation. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By monitoring both request and thread status, the system does not need to rely on a fixed timeout and thus makes better use of resources than other systems that require fixed timeout based requests. Further, the monitoring of both requests and threads decreases the likelihood that content for high-latency requests may be omitted from indexing operations. The method also automatically adjusts to each particular application, and need not be individually tuned or otherwise require application-specific parameters. Should a particular application be compiled such that its threads are not be accessible for monitoring, the system will still be able to provide a "best efforts" estimate of when a load is done by relying on the status of the monitored requests.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system receives a set of deep links for a native application and, for each deep link, instantiates the native application in preparation for crawling and indexing content provided by the native application in response to the deep link. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

A deep link is an instruction specifying a particular environment instance of a native application and configured to cause the native application to instantiate the environment instance of the specified native application when selected at a user device. The native application generates the environment instance for display within the native application on a user device. For example, a deep link may specify a selection menu for a game environment; or content from a website, such as a news site, forum, and the like; or a particular recipe for a cooking application; and the like.

To properly crawl and index native application content, the system must determine when the native application is sufficiently instantiated, e.g., finished loading and displaying the content that should be crawled for the deep link. Applications, however, may go through many states: fetching some content, processing the content, showing intermediate results before displaying final results, etc.

The system and methods in this specification perform an automatic and application-independent way of determining when an application is sufficiently instantiated for a crawling and indexing operation. In some implementations, a system monitors requests sent by the native application in response to instantiation, and determines when the requests have been fulfilled. When the requests have been fulfilled, the system determines if a set of threads for the native application are idle. The set of threads being idle after the requests are fulfilled is interpreted as a signal that the native application is sufficiently instantiated for a crawling and indexing operation. In response, the system generates a load signal, which causes a search system to crawl the content output by the native application and index the content.

These features and additional features are described in more detail below.

Figure 1:
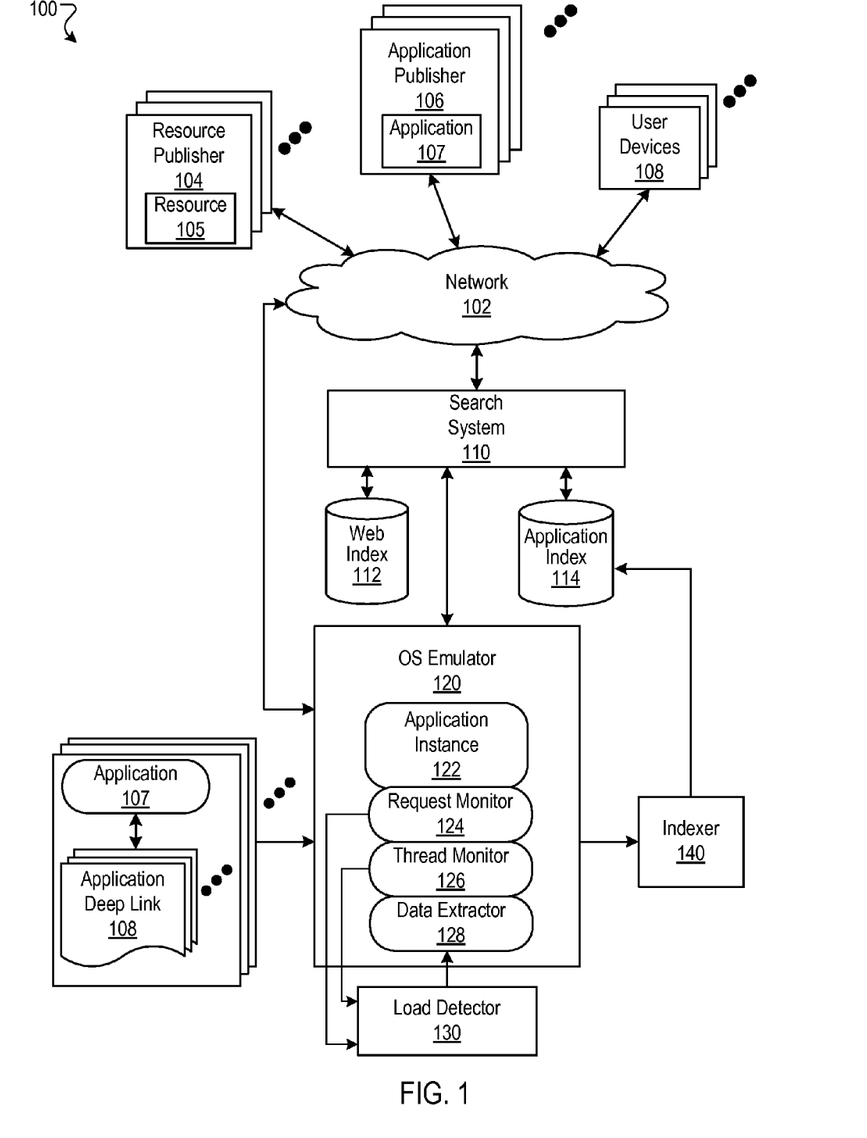
FIG. 1 is a block diagram of an example environment in which native applications are indexed in response to determining the native applications are sufficiently instantiated.

FIG. 1 is a block diagram of an example environment 100 in which native applications are indexed in response to determining the native applications are sufficiently instantiated.

A computer network 102, such as the Internet, connects resource publisher web sites 104, application publishers 106, user devices 108 and a search system 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search system 110 accesses a web index 112 and an application index 114. The web index 112 is an index of web resources 105 that has, for example, been built from crawling the publisher web sites 104. The application index 114 is an index of environment instances for native applications 107, and is constructed using an indexer 114 that receives data crawled from an application instance 122 of a native application. Although shown as separate indexes, the web index 112 and the application index 114 can be combined in a single index.

The user devices 108 submit search queries to the search system 110. In response to each query, the search system 110 accesses the web index 112 and the application index 114 to identify resources and applications, respectively, that are relevant to the query. The search system 110 may, for example, identify the resources and applications in the form of web resource search results and native application search results, respectively. Once generated, the search results are provided to the user device 108 from which the query was received.

A web resource search result is data generated by the search system 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of environment instances. A native application search results includes a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot.

As described above, publishers 106 that provide native applications 107 also provide deep links to the search system 110. Furthermore, third parties may also provide deep links for native applications. Additionally, the search system 110 can discover deep links from other multiple sources, such as app maps, web page annotations, etc., and thus the set of deep links may be constantly changing. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

To crawl and index the native applications 107, the search system 110, or a system associated with the search system 110, uses an operating system emulator 120 that emulates an operating system on which native applications 107 are executed. The operating system emulator 120 instantiates an instance 122 of a native application for each deep link 108. During instantiation, a load detector 130 receives data from a request monitor 124 and a thread monitor 126, and, using the received data, determines if the native application instance 122 is sufficiently instantiated for a crawling and indexing operation. When the load detector determines the native application instance 122 is sufficiently instantiated for the crawling and indexing operation, the load detector 130 generates a load signal. A data extractor 128 receives the load signal, and in response crawls the content of the native application instance 122. The crawled content is provided to the indexer 140, which then indexes the content of the native application in the application index 114.

While the examples below are described in the context of an emulator 120, other devices and environments can be used for monitoring the status of an application. For example, a virtual machine or even an instrumented mobile device can be used.

Figure 2:
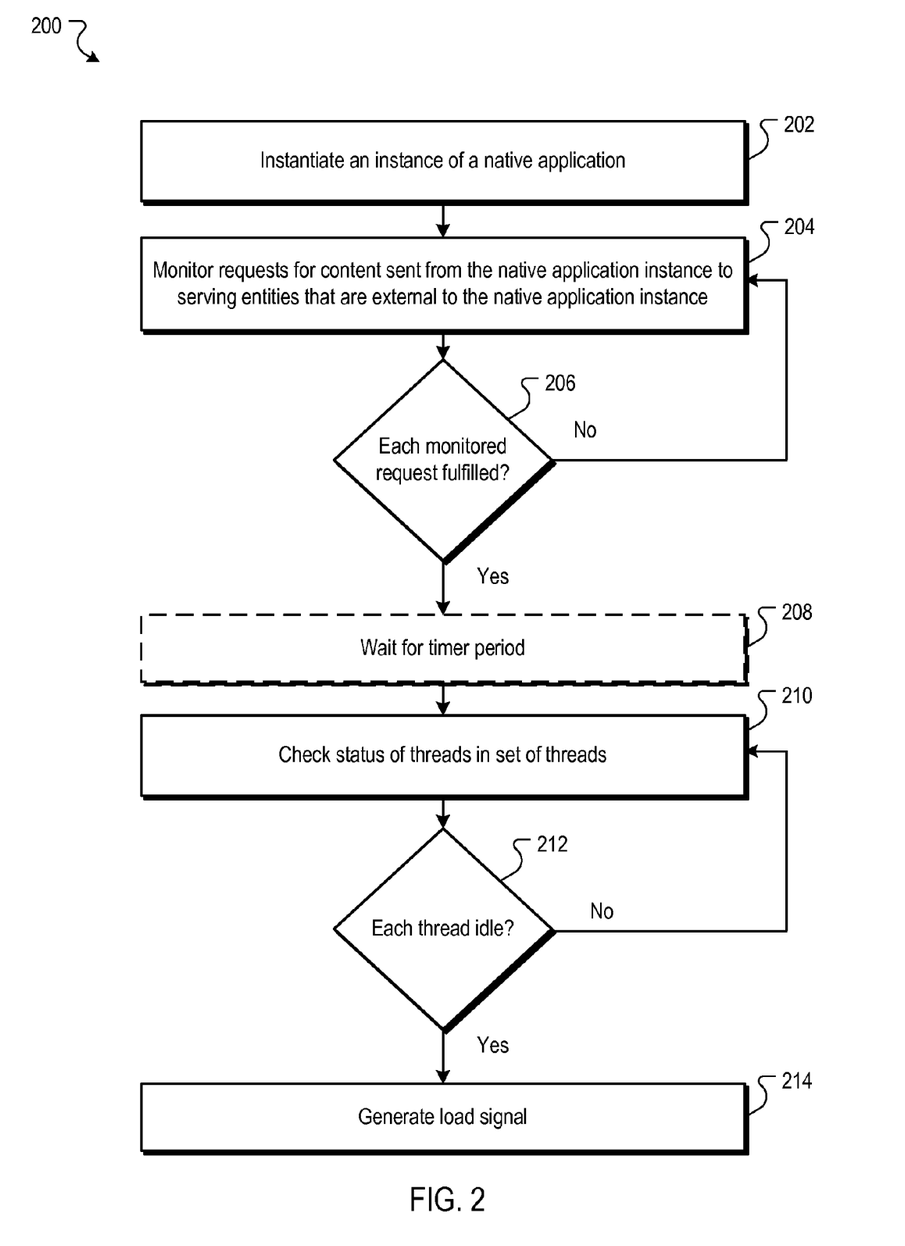
FIG. 2 is a flow diagram of an example process for determining whether an application is sufficiently instantiated.

Generation of the load signal is described in more detail with reference to FIG. 2, which is a flow diagram of an example process 200 for determining whether an application is loaded. The process 200 can be implemented in a data processing apparatus, such as one or more computers in data communication.

The process 200 instantiates an instance of a native application (202). For example, the OS emulator 120 selects a deep link 108 to instantiate a native application. The OS emulator 120 is configured to instrument the instance 122 of the native application so that the request monitor 124 and thread monitor 126 can monitor the status of requests and threads. For example, the thread monitor 126 may be a process that is loaded in the same application process space, such as by loading a shared library with the application instance 122, and is thus able to monitor thread status of the application instance 122. The request monitor 124 can be loaded in a similar manner, or can be loaded entirely separate from the application instance 122.

The process 200 monitors requests for content sent from the native application instance to serving entities that are external to the native application instance (202). For example, the request monitor 124 may be configured to act as a proxy that intercepts requests, logs the requests, and then sends the requests to the external services. The time the request was sent is monitored by the request monitor 124 and the content received in response to the request is also monitored. When content is received in response to a request, the request monitor 124 provides the content to the application instance 122.

Figure 3:
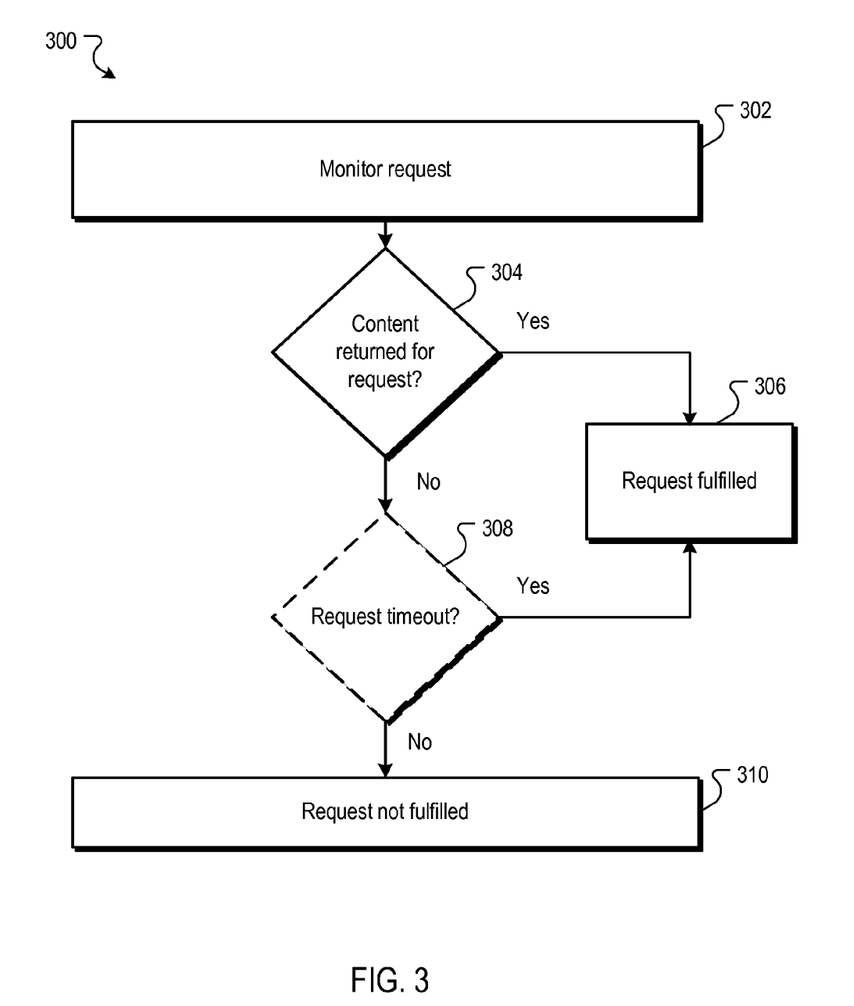
FIG. 3 is a flow diagram of an example process for determining whether a request has been fulfilled.

The process 200 determines whether each monitored request is fulfilled (206). For each request, the request monitor 124 determines, for example, whether content has been received for the request. If content has been received for a request, the request monitor 124 may determine whether the content is responsive to the request. Additionally, the request monitor 124 may also determine if a request has timed out, e.g., a response has not been received within a predefined timeout period. FIG. 3 below describes in more detail an example process 300 of determining whether a request is fulfilled.

If the process 200 determines each monitored request is not fulfilled, e.g., if at least one monitored request is not fulfilled, then the process returns to stage 204. However, if the process 200 determines each monitored request is fulfilled, then the process 200 waits for a timer period (208). This step is optional, as indicated by phantom process block. The timer period is selected to provide enough time for the application instance to process the content received from the requests.

The process 200 then checks the status of threads in a set of threads (210). The thread status for the set may include, for example, processor utilization for the thread, whether the thread has any unfilled IPC calls, and whether a message queue for the threads is empty. The status of other features can also be considered. Examples of thread status checks are described with reference to FIGS. 4 and 5 below.

Not all threads of the native application instance 122 need be monitored. For example, certain background threads unrelated to the user interface may be omitted from the monitoring process. In some implementations, only UI threads are monitored, as the UI threads are responsible for processing the content that is displayed by the native application instance 122 and that is crawled and indexed.

The process 200 determines, based on the status of the threads, whether each thread is idle (212). For example, if each thread has very low processor utilization, has no associated IPC call that is unfulfilled, and a message queue for the threads is empty, then the process 200 may determine that each thread is idle. All of these features, however, need not be checked to make the determination; for example, the determination can be made solely on the processing utilization of each thread.

If the process 200 determines each thread is not idle, e.g., at least one thread is not idle, then the process returns to stage 210. Otherwise, if the process 200 determines each thread is idle, then the process 200 generates the load signal (214). The load signal is then provided to the data extractor 128, which then beings the crawling process to collect data for indexing by the indexer 140.

FIG. 3 is a flow diagram of an example process 300 for determining whether a request has been fulfilled. The process 300 is done for each monitored request.

The process 300 monitors a request (302). For example, as described above, the request monitor 124 monitors for content to be returned for the request.

The process 300 determines content is returned for the request (304). If content is returned for the request, then the process may determine that the request is fulfilled (306), depending on the content returned. For example, in some implementations, a request is deemed fulfilled only if the content received is responsive to the request, and does not indicate an incomplete response or an error. For example, an error may be a notification that an address to which the request was sent is unresolvable or a requested resource no longer exits. The failure of the request being fulfilled will preclude crawling and indexing of the native application instance 122. Such a result may be desirable to ensure that the search system 110 provides search results for only deep links for which content is available.

In other implementations, a request is deemed fulfilled even if the content received indicates an incomplete response or an error. This can occur when it is desired to index a native application using "best efforts." Thus, even if all the requested content is not available, at least the content received will be crawled and indexed.

If the process 300 determines content is not returned for the request, then the process 300 determines if a request timeout has occurred (308). This stage may be optional, and can be implemented when it is desired to index a native application using best efforts as described above. The request time can be a time period that is selected so that at the expiration of the time period the request is likely to have been fulfilled but for an error. The time can be selected based on historical observations, or can be a fixed time period, e.g., five seconds. The time period is measured from the time the request handler 124 sent the request.

If the process 300 determines the request timeout has occurred, then the process 300 determines the request is fulfilled (306). Otherwise, the process 300 determines the request is not fulfilled (310).

Once the process 300 determines all requests for the native application instance are fulfilled, the thread monitor 126 can begin monitoring the status of threads in the native application instance.

Figure 4:
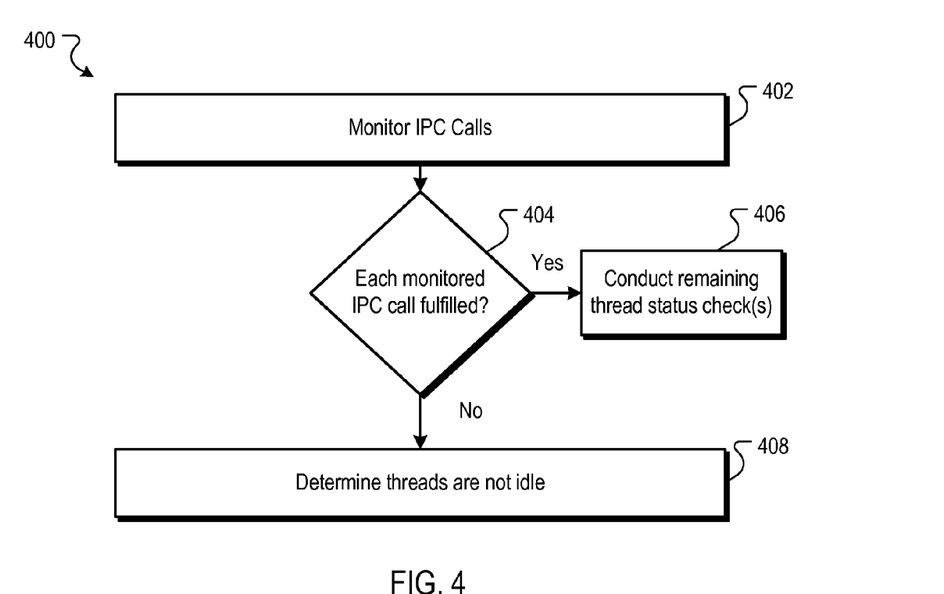
FIG. 4 is a flow diagram of an example process for monitoring inter-process communication (IPC) calls for threads.

FIG. 4 is a flow diagram of an example process 400 for monitoring inter-process communication (IPC) calls for threads. The process 400 is done for a set of monitored threads.

The process 400 monitors IPC calls (402). The IPC calls are used to exchange data among threads. In some implementations, only IPC calls related to the monitored threads are monitored. For example, an IPC that is unrelated to any of the monitored threads is not monitored by the thread monitor 126, as its fulfillment is unlikely to have an effect on the data displayed in the user interface. The monitoring of the IPC calls can be done by instrumenting the native application 107, or by a separate process run on the OS emulator 120.

The process 400 determines if each monitored IPC call is fulfilled (402). In some implementations, an IPC call is determined to be fulfilled when a return value is received. For example, the thread monitor 126, in response to detecting the transmission of a call and its data from a local process and address space to a remote process and address space, will monitor for the expected return values that are transmitted in the opposite direction. When the return values are observed, the IPC call is determined to be fulfilled.

If the process 400 determines each monitored IPC call is fulfilled, then the process conducts the remaining thread status check(s) (406). For example, the thread monitor 126 may perform other process checks to determine if a set of monitored threads is idle. Alternatively, if no other checks are to be performed, the thread monitor 126 may determine the set of threads are idle.

If, however, the process 400 determines each monitored IPC call is not fulfilled, e.g., if one or more IPC called is not fulfilled, then the process determines the threads are not idle (408). Monitoring may then continue.

Figure 5:
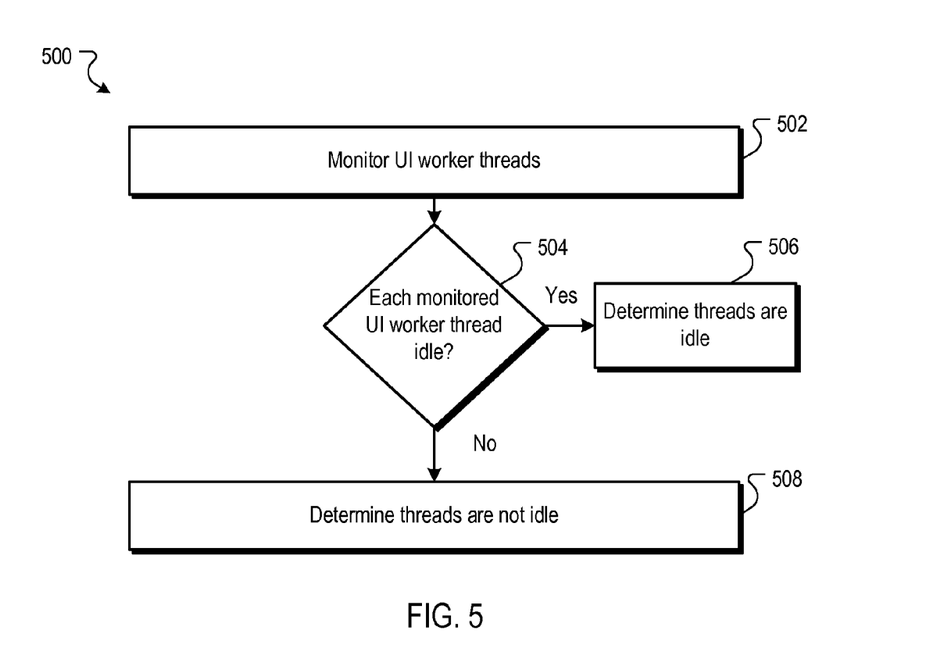
FIG. 5 is a flow diagram of an example process for monitoring user interface (UI) worker threads.

FIG. 5 is a flow diagram of an example process 500 for monitoring user interface (UI) worker threads. The process 500 is done for a set of monitored threads.

The process 500 monitors UI worker threads (502). The thread monitor, for example, may determine processor utilization for each UI worker thread.

The process 500 determines if each monitored UI worker thread is idle (502). For example, if each thread is less than a minimum utilization threshold, the threads will be determined to be idle (506). Conversely, if one or more threads are processing above the minimum utilization threshold, the threads are determined not to be idle (508). Other checks can be made to determine whether a set of threads is idle. For example, a message queue for the set of threads may be checked to determine whether it is empty. An empty queue will indicate the threads are idle (or may be a predicate for determining whether each thread is idle), while a queue with one or more messages may preclude a determination that the threads are idle.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
instantiating, in a computer, an instance of a native application that generates environment instances for display on a user device within the native application instance;

monitoring, at the computer, requests for content sent from the native application instance executing in the computer to serving entities that are external to the native application instance and the computer;

determining whether each monitored request of the requests has been fulfilled indicating no monitored request is unfulfilled;

in response to determining that each monitored request of the requests has been fulfilled:
  determining whether each thread in a set of threads of the native application instance is idle, wherein the determination of whether each thread in the set of threads of the native application instance is idle is done after the determination that each monitored request in the set of requests have been fulfilled;
  generating a load signal in response to determining that each thread in the set of threads of the native application instance is idle, the load signal indicating the native application instance is finished loading sufficiently instantiated to be subject to a crawling operation; and
  in response to the load signal, crawling content of the native application instance.

2. The computer-implemented method of claim 1, wherein determining whether each thread in the set of threads of the native application instance is idle comprises:
  initiating a timer in response to determining that each monitored request has been fulfilled, the timer expiring after a timer period; and
  determining whether each thread in the set of threads of the native application instance is idle only after the time expires after the timer period.

3. The computer-implemented method of claim 2, wherein determining whether each monitored request has been fulfilled comprises determining, for each monitored request, that content requested by each request has been received by the instance of the native application in response to the request.

4. The computer-implemented method of claim 3, wherein determining whether each thread in the set of threads of the native application instance is idle comprises:
  monitoring inter-process communication (IPC) calls of the threads; and
  determining the set of threads of the native application instance are not idle when at least one IPC call is not fulfilled.

5. The computer-implemented method of claim 4, wherein determining whether each thread in the set of threads of the native application instance is idle further comprises determining whether each thread in a set of user interface (UI) worker threads is idle.

6. The computer-implemented method of claim 5, wherein determining whether each thread in the set of threads of the native application instance is idle further comprises:
  determining whether a message queue for the UI worker threads is empty; and
  determining whether each thread in the UI worker threads is idle in response to determining the message queue for the UI worker threads is idle.

7. The computer-implemented method of claim 1, wherein determining whether each monitored request has been fulfilled comprises determining, for each monitored request, that content requested by each request has been received by the instance of the native application in response to the request.

8. The computer-implemented method of claim 1, wherein determining whether each monitored request has been fulfilled comprises determining, for each monitored request, that content requested by each request has been received by the instance of the native application in response to the request or that the request has timed out.

9. The computer-implemented method of claim 1, wherein determining whether each thread in the set of threads of the native application instance is idle comprises:
  monitoring inter-process communication (IPC) calls of the threads; and
  determining the set of threads of the native application instance are not idle when at least one IPC call is not fulfilled.

10. The computer-implemented method of claim 1, determining whether each thread in the set of threads of the native application instance is idle comprises determining whether each thread in a set of user interface (UI) worker threads is idle.

11. The computer-implemented method of claim 10, wherein determining whether each thread in the set of threads of the native application instance is idle further comprises:
  determining whether a message queue for the UI worker threads is empty; and
  determining whether each thread in the UI worker threads is idle in response to determining the message queue for the UI worker threads is idle.

12. A non-transitory computer storage medium encoded with a computer program, the program comprising instructions that when executed by data processing apparatus cause the data processing apparatus to perform operations comprising:
  instantiating, in a computer, an instance of a native application that generates environment instances for display on a user device within the native application instance;
  monitoring, at the computer, requests for content sent from the native application instance executing in the computer to serving entities that are external to the native application instance and the computer;
  determining whether each monitored request of the requests has been fulfilled indicating no monitored request is unfulfilled;
  in response to determining that each monitored request of the requests has been fulfilled:
    determining whether each thread in a set of threads of the native application instance is idle, wherein the determination of whether each thread in the set of threads of the native application instance is idle is done after the determination that each monitored request in the set of requests has been fulfilled;
    generating a load signal in response to determining that each thread in the set of threads of the native application instance is idle, the load signal indicating the native application instance is finished loading to be subject to a crawling operation; and
    in response to the load signal, crawling content of the native application instance.

13. A system, comprising:
a data processing apparatus; and
software stored in non-transitory computer readable storage medium storing instructions executable by the data processing apparatus and that upon such execution cause the data processing apparatus to perform operations comprising:

instantiating, in a computer, an instance of a native application that generates environment instances for display on a user device within the native application instance;

monitoring, at the computer, requests for content sent from the native application instance executing in the computer to serving entities that are external to the native application instance and the computer;

determining whether each monitored request of the requests has been fulfilled indicating no monitored request is unfulfilled;

in response to determining that each monitored request of the requests has been fulfilled:
  determining whether each thread in a set of threads of the native application instance is idle, wherein the determination of whether each thread in the set of threads of the native application instance is idle is done after the determination that each monitored request in the set of requests has been fulfilled;
  generating a load signal in response to determining that each thread in the set of threads of the native application instance is idle, the load signal indicating the native application instance is finished loading to be subject to a crawling operation; and
  in response to the load signal, crawling content of the native application instance.

14. The system of claim 13, wherein determining whether each thread in the set of threads of the native application instance is idle comprises:
  initiating a timer in response to determining that the each monitored request has been fulfilled, the timer expiring after a timer period; and
  determining whether each thread in the set of threads of the native application instance is idle only after the time expires after the timer period.

15. The system of claim 14, wherein determining whether each monitored request has been fulfilled comprises determining, for each monitored request, that content requested by each request has been received by the instance of the native application in response to the request.

16. The system of claim 15, wherein determining whether each thread in the set of threads of the native application instance is idle comprises:
  monitoring inter-process communication (IPC) calls of the threads; and
  determining the set of threads of the native application instance are not idle when at least one IPC call is not fulfilled.

17. The system of claim 16, wherein determining whether each thread in the set of threads of the native application instance is idle further comprises determining whether each thread in a set of user interface (UI) worker threads is idle.

18. The system of claim 17, wherein determining whether each thread in the set of threads of the native application instance is idle further comprises:
  determining whether a message queue for the UI worker threads is empty; and
  determining whether each thread in the UI worker threads is idle in response to determining the message queue for the UI worker threads is idle.

19. The system of claim 13, wherein determining whether each monitored request has been fulfilled comprises determining, for each monitored request, that content requested by each request has been received by the instance of the native application in response to the request or that the request has timed out.

20. The system of claim 13, wherein determining whether each thread in the set of threads of the native application instance is idle comprises:
  monitoring inter-process communication (IPC) calls of the threads; and
  determining the set of threads of the native application instance are not idle when at least one IPC call is not fulfilled.

21. The system of claim 13, wherein determining whether each thread in the set of threads of the native application instance is idle comprises determining whether each thread in a set of user interface (UI) worker threads is idle.

* * * * *